(12) United States Patent
Rastogi

(10) Patent No.: US 12,469,028 B2
(45) Date of Patent: Nov. 11, 2025

(54) METHOD, SYSTEM, AND COMPUTER PROGRAM PRODUCT FOR ENHANCED ONE-TIME PASSWORD-BASED TRANSACTION AUTHORIZATION

(71) Applicant: Visa International Service Association, San Francisco, CA (US)

(72) Inventor: Ayushi Rastogi, Punggol (SG)

(73) Assignee: Visa International Service Association, San Francisco, CA (US)

( * ) Notice: Subject to any disclaimer, the term of this patent is extended or adjusted under 35 U.S.C. 154(b) by 232 days.

(21) Appl. No.: 18/481,283

(22) Filed: Oct. 5, 2023

(65) Prior Publication Data

US 2025/0117788 A1  Apr. 10, 2025

(51) Int. Cl.
*G06Q 20/00* (2012.01)
*G06Q 20/38* (2012.01)

(52) U.S. Cl.
CPC .................. *G06Q 20/385* (2013.01)

(58) Field of Classification Search
CPC .................................................. G06Q 20/385
See application file for complete search history.

(56) References Cited

U.S. PATENT DOCUMENTS

| | | | | |
|---|---|---|---|---|
| 10,438,437 B1* | 10/2019 | Herrington | .......... | H04W 12/041 |
| 10,713,649 B1* | 7/2020 | Rule | .......... | G06Q 20/352 |
| 11,405,189 B1* | 8/2022 | Bennison | .......... | H04L 63/0807 |
| 2008/0172556 A1* | 7/2008 | Ishikawa | .......... | G06F 21/575 |
| | | | | 726/2 |
| 2011/0289576 A1* | 11/2011 | Cheng | .......... | G09C 1/00 |
| | | | | 726/9 |
| 2011/0321145 A1* | 12/2011 | Shimotono | .......... | H04L 9/3228 |
| | | | | 726/3 |
| 2016/0086184 A1* | 3/2016 | Carpenter | .......... | G06Q 20/4016 |
| | | | | 705/44 |
| 2020/0184451 A1* | 6/2020 | Hafner | .......... | G06Q 20/405 |
| 2021/0004786 A1* | 1/2021 | Mossler | .......... | H04L 9/3073 |
| 2021/0342816 A1* | 11/2021 | Benkreira | .......... | G06Q 20/409 |
| 2022/0108331 A1* | 4/2022 | Thomson | .......... | G06Q 40/02 |

(Continued)

OTHER PUBLICATIONS

Transaction signing on multiple channels IEEE (Year: 2017).*
Secure E-Payment Method Based on Visual Cryptography, IEEE (Year: 2018).*

*Primary Examiner* — Bruce I Ebersman
(74) *Attorney, Agent, or Firm* — The Webb Law Firm

(57) ABSTRACT

Described are a method, system, and computer program product for enhanced one-time password-based transaction authorization. The method includes receiving a transaction request initiated by a user, and generating and transmitting a one-time password (OTP) to a user communication device of the user. The method also includes receiving a response code from the user communication device of the user. The method further includes verifying that the first portion of the response code matches the OTP. The method further includes identifying a user code stored in association with the user and verifying that the second portion of the response code matches the user code. The method further includes, in response to verifying that the first portion of the response code matches the OTP and that the second portion of the response code matches the user code, automatically authorizing the transaction request to be processed in an electronic payment processing network.

17 Claims, 5 Drawing Sheets

(56) References Cited

U.S. PATENT DOCUMENTS

| | | | |
|---|---|---|---|
| 2023/0071323 A1* | 3/2023 | Spratt | G06Q 20/3224 |
| 2023/0186313 A1* | 6/2023 | Adkins | G06Q 20/382 |
| | | | 705/43 |
| 2023/0342736 A1* | 10/2023 | Khadar | G06Q 20/4014 |
| 2023/0376958 A1* | 11/2023 | Bahia | G06Q 20/425 |

* cited by examiner

METHOD, SYSTEM, AND COMPUTER PROGRAM PRODUCT FOR ENHANCED ONE-TIME PASSWORD-BASED TRANSACTION AUTHORIZATION

BACKGROUND

1. Technical Field

This disclosure relates generally to electronic transaction security and, in non-limiting embodiments or aspects, to methods, systems, and computer program products for enhanced one-time password-based transaction authorization.

2. Technical Considerations

One-time passwords used in a two-factor authentication process may be considered to be a more secure method of transacting, as compared to a strict one-factor authentication that only requires a user to input a credential (e.g., a username, a password, a PIN, and/or the like). For example, a one-time password may be generated and transmitted to a mobile device of a user, and the user may be prompted to enter the one-time password in an interface in order to have a transaction authorized. However, even existing one-time password schemes are subject to security threats stemming from stolen user devices and/or device emulation/spoofing. By way of further example, a virtual subscriber identification module (SIM) for a user device may be stolen and used by a malicious entity to spoof the user device and intercept a one-time password. For this reason, the two-factor authentication process may be attacked through possession or emulation of a user device that was otherwise authorized to receive one-time passwords.

There is a need in the art for a technical solution to enhance the one-time password transaction authorization flow, particularly to overcome security threats caused by stolen or emulated devices, without stagnating the transaction process flow or increasing the computer resources required for the transaction process flow.

SUMMARY

According to some non-limiting embodiments or aspects, provided are methods, systems, and computer program products for enhanced one-time password-based based transaction authorization that overcome some or all of the deficiencies identified above.

According to some non-limiting embodiments or aspects, provided is a computer-implemented method for enhanced one-time password-based transaction authorization. The method includes receiving, with at least one processor, a transaction request initiated by a user in communication with at least one merchant system. The method also includes generating, with at least one processor, a one-time password (OTP). The method further includes transmitting, with at least one processor, the OTP to a user communication device of the user. The method further includes receiving, with at least one processor, a response code from the user communication device of the user, the response code including a first portion and a second portion. The method further includes verifying, with at least one processor, that the first portion of the response code matches the OTP. The method further includes identifying, with at least one processor, a user code stored in association with the user, the user code stored in at least one data storage device prior to receiving the transaction request. The method further includes verifying, with at least one processor, that the second portion of the response code matches the user code. The method further includes, in response to verifying that the first portion of the response code matches the OTP and that the second portion of the response code matches the user code, automatically authorizing, with at least one processor, the transaction request to be processed in an electronic payment processing network.

In some non-limiting embodiments or aspects, the user code may be associated with a user profile of the user stored in the at least one data storage device. The method may further include determining, with at least one processor, a position preference associated with the user profile, the position preference comprising an indication that: the user code should be appended in a leading position in response codes, or the user code should be appended in a trailing position in response codes. The method may further include determining, with at least one processor, the first portion and the second portion of the response code based on the position preference associated with the user profile.

In some non-limiting embodiments or aspects, the position preference associated with the user profile may include an indication that the user code should be appended in a trailing position in response codes. Determining the first portion and the second portion of the response code based on the position preference associated with the user profile may include determining the first portion as being a first subsequence of characters of the response code, based on the position preference, and determining the second portion as being a second subsequence of characters of the response code, based on the position preference. The second subsequence may not overlap with the first subsequence, and the second subsequence may be positioned after the first subsequence.

In some non-limiting embodiments or aspects, the method may also include, before the transaction request is initiated by the user, receiving, with at least one processor, the user code from the user communication device of the user, and determining, with at least one processor, at least one primary account number (PAN) associated with at least one payment device of the user, wherein each PAN of the at least one PAN includes a sequence of numbers. The method may further include, before the transaction request is initiated by the user, comparing, with at least one processor, the user code to a plurality of subsequences of numbers in the at least one PAN, and, in response to determining that the user code does not match any of the plurality of subsequences of numbers in the at least one PAN, storing, with at least one processor, the user code in the at least one data storage device in association with the user profile.

In some non-limiting embodiments or aspects, the method may also include, before the transaction request is initiated by the user, receiving, with at least one processor, an identification of the position preference from the user communication device of the user, and storing, with at least one processor, the position preference in association with the user profile in the at least one data storage device.

In some non-limiting embodiments or aspects, the method may include receiving, with at least one processor, a second transaction request initiated by a second user in communication with the at least one merchant system. The method may also include generating, with at least one processor, a second OTP and transmitting, with at least one processor, the second OTP to a second user communication device of the second user. The method may further include receiving, with at least one processor, a second response code from the second user communication device of the second user, the second response code including a first portion and a second portion. The method may further include determining, with at least one processor, that a second position preference associated with a second user profile of the second user includes an indication that the second user code should be appended in a leading position in response codes. The method may further include verifying, with at least one processor, that the second portion of the second response code including a leading subsequence of characters in the second response code matches the second user code, and verifying, with at least one processor, that the first portion of the second response code including a trailing subsequence of characters in the second response code matches the second OTP. The method may further include, in response to verifying that the first portion of the second response code matches the second OTP and that the second portion of the second response code matches the second user code, automatically authorizing, with at least one processor, the second transaction request to be processed in the electronic payment processing network.

In some non-limiting embodiments or aspects, the response code may include a sequence of characters, the first portion may include a first subsequence of characters in the sequence of characters, and the second portion may include a second subsequence of characters in the sequence of characters.

In some non-limiting embodiments or aspects, the sequence of characters of the response code may include a sequence of six numbers, the first subsequence of characters may include a subsequence of three numbers, and the second subsequence of characters may include a subsequence of three numbers.

According to some non-limiting embodiments or aspects, provided is a system for enhanced one-time password-based transaction authorization. The system includes at least one processor. The at least one processor is programmed or configured to receive a transaction request initiated by a user in communication with at least one merchant system. The at least one processor is also programmed or configured to generate a one-time password (OTP). The at least one processor is further programmed or configured to transmit the OTP to a user communication device of the user and receive a response code from the user communication device of the user, the response code including a first portion and a second portion. The at least one processor is further programmed or configured to verify that the first portion of the response code matches the OTP. The at least one processor is further programmed or configured to identify a user code stored in association with the user, the user code stored in at least one data storage device prior to receiving the transaction request. The at least one processor is further programmed or configured to verify that the second portion of the response code matches the user code. The at least one processor is further programmed or configured to, in response to verifying that the first portion of the response code matches the OTP and that the second portion of the response code matches the user code, automatically authorize the transaction request to be processed in an electronic payment processing network.

In some non-limiting embodiments or aspects, the user code may be associated with a user profile of the user stored in the at least one data storage device. The at least one processor may be further programmed or configured to determine a position preference associated with the user profile, the position preference comprising an indication that: the user code should be appended in a leading position in response codes, or the user code should be appended in a trailing position in response codes. The at least one processor may be further programmed or configured to determine the first portion and the second portion of the response code based on the position preference associated with the user profile.

In some non-limiting embodiments or aspects, the position preference associated with the user profile may include an indication that the user code should be appended in a trailing position in response codes. When determining the first portion and the second portion of the response code based on the position preference associated with the user profile, the at least one processor may be programmed or configured to determine the first portion as being a first subsequence of characters of the response code, based on the position preference, and determine the second portion as being a second subsequence of characters of the response code, based on the position preference. The second subsequence may not overlap with the first subsequence, and the second subsequence may be positioned after the first subsequence.

In some non-limiting embodiments or aspects, the at least one processor may be further programmed or configured to, before the transaction request is initiated by the user, receive the user code from the user communication device of the user and determine at least one primary account number (PAN) associated with at least one payment device of the user, wherein each PAN of the at least one PAN includes a sequence of numbers. The at least one processor may be further programmed or configured to, before the transaction request is initiated by the user, compare the user code to a plurality of subsequences of numbers in the at least one PAN, and, in response to determining that the user code does not match any of the plurality of subsequences of numbers in the at least one PAN, store the user code in the at least one data storage device in association with the user profile.

In some non-limiting embodiments or aspects, the at least one processor may be further programmed or configured to, before the transaction request is initiated by the user, receive an identification of the position preference from the user communication device of the user, and store the position preference in association with the user profile in the at least one data storage device.

In some non-limiting embodiments or aspects, the at least one processor may be further programmed or configured to receive a second transaction request initiated by a second user in communication with the at least one merchant system and generate a second OTP. The at least one processor may also be programmed or configured to transmit the second OTP to a second user communication device of the second user, and receive a second response code from the second user communication device of the second user, the second response code including a first portion and a second portion. The at least one processor may further be programmed or configured to determine that a second position preference associated with a second user profile of the second user includes an indication that the second user code should be appended in a leading position in response codes. The at least one processor may further be programmed or configured to verify that the second portion of the second response code including a leading subsequence of characters in the second response code matches the second user code. The at least one processor may further be programmed or configured to verify that the first portion of the second response code including a trailing subsequence of characters in the second response code matches the second OTP. The at least one processor may further be programmed or configured to, in response to verifying that the first portion of the second response code matches the second OTP and that the second portion of the second response code matches the second user code, automatically authorize the second transaction request to be processed in the electronic payment processing network.

According to some non-limiting embodiments or aspects, provided is a computer program product for enhanced one-time password-based transaction authorization. The computer program product includes at least one non-transitory computer-readable medium including one or more instructions that, when executed by at least one processor, cause the at least one processor to receive a transaction request initiated by a user in communication with at least one merchant system. The one or more instructions also cause the at least one processor to generate a one-time password (OTP) and transmit the OTP to a user communication device of the user. The one or more instructions further cause the at least one processor to receive a response code from the user communication device of the user, the response code including a first portion and a second portion. The one or more instructions further cause the at least one processor to verify that the first portion of the response code matches the OTP and identify a user code stored in association with the user, the user code stored in at least one data storage device prior to receiving the transaction request. The one or more instructions further cause the at least one processor to verify that the second portion of the response code matches the user code. The one or more instructions further cause the at least one processor to, in response to verifying that the first portion of the response code matches the OTP and that the second portion of the response code matches the user code, automatically authorize the transaction request to be processed in an electronic payment processing network.

In some non-limiting embodiments or aspects, the user code may be associated with a user profile of the user stored in the at least one data storage device. The one or more instructions may further cause the at least one processor to determine a position preference associated with the user profile, the position preference comprising an indication that: the user code should be appended in a leading position in response codes, or the user code should be appended in a trailing position in response codes. The one or more instructions may further cause the at least one processor to determine the first portion and the second portion of the response code based on the position preference associated with the user profile.

In some non-limiting embodiments or aspects, the position preference associated with the user profile may include an indication that the user code should be appended in a trailing position in response codes. The one or more instructions that cause the at least one processor to determine the first portion and the second portion of the response code based on the position preference associated with the user profile may cause the at least one processor to determine the first portion as being a first subsequence of characters of the response code, based on the position preference, and determine the second portion as being a second subsequence of characters of the response code, based on the position preference. The second subsequence may not overlap with the first subsequence, and the second subsequence may be positioned after the first subsequence.

In some non-limiting embodiments or aspects, the one or more instructions may further cause the at least one processor to, before the transaction request is initiated by the user, receive the user code from the user communication device of the user, and determine at least one primary account number (PAN) associated with at least one payment device of the user, wherein each PAN of the at least one PAN includes a sequence of numbers. The one or more instructions may further cause the at least one processor to, before the transaction request is initiated by the user, compare the user code to a plurality of subsequences of numbers in the at least one PAN, and, in response to determining that the user code does not match any of the plurality of subsequences of numbers in the at least one PAN, store the user code in the at least one data storage device in association with the user profile.

In some non-limiting embodiments or aspects, the one or more instructions may further cause the at least one processor to, before the transaction request is initiated by the user, receive an identification of the position preference from the user communication device of the user, and store the position preference in association with the user profile in the at least one data storage device.

In some non-limiting embodiments or aspects, the one or more instructions may further cause the at least one processor to receive a second transaction request initiated by a second user in communication with the at least one merchant system, and generate a second OTP. The one or more instructions may further cause the at least one processor to transmit the second OTP to a second user communication device of the second user, and receive a second response code from the second user communication device of the second user, the second response code including a first portion and a second portion. The one or more instructions may further cause the at least one processor to determine that a second position preference associated with a second user profile of the second user includes an indication that the second user code should be appended in a leading position in response codes. The one or more instructions may further cause the at least one processor to verify that the second portion of the second response code including a leading subsequence of characters in the second response code matches the second user code. The one or more instructions may further cause the at least one processor to verify that the first portion of the second response code including a trailing subsequence of characters in the second response code matches the second OTP. The one or more instructions may further cause the at least one processor to, in response to verifying that the first portion of the second response code matches the second OTP and that the second portion of the second response code matches the second user code, automatically authorize the second transaction request to be processed in the electronic payment processing network.

Other non-limiting embodiments or aspects will be set forth in the following numbered clauses:

Clause 1: A computer-implemented method comprising: receiving, with at least one processor, a transaction request initiated by a user in communication with at least one merchant system; generating, with at least one processor, a one-time password (OTP); transmitting, with at least one processor, the OTP to a user communication device of the user; receiving, with at least one processor, a response code from the user communication device of the user, the response code comprising a first portion and a second portion; verifying, with at least one processor, that the first portion of the response code matches the OTP; identifying, with at least one processor, a user code stored in association with the user, the user code stored in at least one data storage device prior to receiving the transaction request; verifying, with at least one processor, that the second portion of the response code matches the user code; and, in response to verifying that the first portion of the response code matches the OTP and that the second portion of the response code matches the user code, automatically authorizing, with at least one processor, the transaction request to be processed in an electronic payment processing network.

Clause 2: The computer-implemented method of clause 1, wherein the user code is associated with a user profile of the user stored in the at least one data storage device, the method further comprising: determining, with at least one processor, a position preference associated with the user profile, the position preference comprising an indication that: the user code should be appended in a leading position in response codes, or the user code should be appended in a trailing position in response codes; and determining, with at least one processor, the first portion and the second portion of the response code based on the position preference associated with the user profile.

Clause 3: The computer-implemented method of clause 1 or clause 2, wherein the position preference associated with the user profile comprises an indication that the user code should be appended in a trailing position, and wherein determining the first portion and the second portion of the response code based on the position preference associated with the user profile comprises: determining the first portion as being a first subsequence of characters of the response code, based on the position preference; and determining the second portion as being a second subsequence of characters of the response code, based on the position preference, wherein the second subsequence does not overlap with the first subsequence, and wherein the second subsequence is positioned after the first subsequence.

Clause 4: The computer-implemented method of any of clauses 1-3, further comprising, before the transaction request is initiated by the user: receiving, with at least one processor, the user code from the user communication device of the user; determining, with at least one processor, at least one primary account number (PAN) associated with at least one payment device of the user, wherein each PAN of the at least one PAN comprises a sequence of numbers; comparing, with at least one processor, the user code to a plurality of subsequences of numbers in the at least one PAN; and, in response to determining that the user code does not match any of the plurality of subsequences of numbers in the at least one PAN, storing, with at least one processor, the user code in the at least one data storage device in association with the user profile.

Clause 5: The computer-implemented method of clauses 1-4, further comprising, before the transaction request is initiated by the user: receiving, with at least one processor, an identification of the position preference from the user communication device of the user; and storing, with at least one processor, the position preference in association with the user profile in the at least one data storage device.

Clause 6: The computer-implemented method of any of clauses 1-5, further comprising: receiving, with at least one processor, a second transaction request initiated by a second user in communication with the at least one merchant system; generating, with at least one processor, a second OTP; transmitting, with at least one processor, the second OTP to a second user communication device of the second user; receiving, with at least one processor, a second response code from the second user communication device of the second user, the second response code comprising a first portion and a second portion; determining, with at least one processor, that a second position preference associated with a second user profile of the second user comprises an indication that the second user code should be appended in a leading position in response codes; verifying, with at least one processor, that the second portion of the second response code comprising a leading subsequence of characters in the second response code matches the second user code; verifying, with at least one processor, that the first portion of the second response code comprising a trailing subsequence of characters in the second response code matches the second OTP; and, in response to verifying that the first portion of the second response code matches the second OTP and that the second portion of the second response code matches the second user code, automatically authorizing, with at least one processor, the second transaction request to be processed in the electronic payment processing network.

Clause 7: The computer-implemented method of any of clauses 1-6, wherein the response code comprises a sequence of characters, the first portion comprises a first subsequence of characters in the sequence of characters, and the second portion comprises a second subsequence of characters in the sequence of characters.

Clause 8: The computer-implemented method of any of clauses 1-7, wherein the sequence of characters of the response code comprises a sequence of six numbers, the first subsequence of characters comprises a subsequence of three numbers, and the second subsequence of characters comprises a subsequence of three numbers.

Clause 9: A system comprising at least one processor programmed or configured to: receive a transaction request initiated by a user in communication with at least one merchant system; generate a one-time password (OTP); transmit the OTP to a user communication device of the user; receive a response code from the user communication device of the user, the response code comprising a first portion and a second portion; verify that the first portion of the response code matches the OTP; identify a user code stored in association with the user, the user code stored in at least one data storage device prior to receiving the transaction request; verify that the second portion of the response code matches the user code; and, in response to verifying that the first portion of the response code matches the OTP and that the second portion of the response code matches the user code, automatically authorize the transaction request to be processed in an electronic payment processing network.

Clause 10: The system of clause 9, wherein the user code is associated with a user profile of the user stored in the at least one data storage device, and wherein the at least one processor is further programmed or configured to: determine a position preference associated with the user profile, the position preference comprising an indication that: the user code should be appended in a leading position in response codes, or the user code should be appended in a trailing position in response codes; and determine the first portion and the second portion of the response code based on the position preference associated with the user profile.

Clause 11: The system of clause 9 or clause 10, wherein the position preference associated with the user profile comprises an indication that the user code should be appended in a trailing position in response codes, and wherein, when determining the first portion and the second portion of the response code based on the position preference associated with the user profile, the at least one processor is programmed or configured to: determine the first portion as being a first subsequence of characters of the response code, based on the position preference; and determine the second portion as being a second subsequence of characters of the response code, based on the position preference, wherein the second subsequence does not overlap with the first subsequence, and wherein the second subsequence is positioned after the first subsequence.

Clause 12: The system of any of clauses 9-11, wherein the at least one processor is further programmed or configured to, before the transaction request is initiated by the user: receive the user code from the user communication device of the user; determine at least one primary account number (PAN) associated with at least one payment device of the user, wherein each PAN of the at least one PAN comprises a sequence of numbers; compare the user code to a plurality of subsequences of numbers in the at least one PAN; and, in response to determining that the user code does not match any of the plurality of subsequences of numbers in the at least one PAN, store the user code in the at least one data storage device in association with the user profile.

Clause 13: The system of any of clauses 9-12, wherein the at least one processor is further programmed or configured to, before the transaction request is initiated by the user: receive an identification of the position preference from the user communication device of the user; and store the position preference in association with the user profile in the at least one data storage device.

Clause 14: The system of any of clauses 9-13, wherein the at least one processor is further programmed or configured to: receive a second transaction request initiated by a second user in communication with the at least one merchant system; generate a second OTP; transmit the second OTP to a second user communication device of the second user; receive a second response code from the second user communication device of the second user, the second response code comprising a first portion and a second portion; determine that a second position preference associated with a second user profile of the second user comprises an indication that the second user code should be appended in a leading position in response codes; verify that the second portion of the second response code comprising a leading subsequence of characters in the second response code matches the second user code; verify that the first portion of the second response code comprising a trailing subsequence of characters in the second response code matches the second OTP; and, in response to verifying that the first portion of the second response code matches the second OTP and that the second portion of the second response code matches the second user code, automatically authorize the second transaction request to be processed in the electronic payment processing network.

Clause 15: A computer program product comprising at least one non-transitory computer-readable medium comprising one or more instructions that, when executed by at least one processor, cause the at least one processor to: receive a transaction request initiated by a user in communication with at least one merchant system; generate a one-time password (OTP); transmit the OTP to a user communication device of the user; receive a response code from the user communication device of the user, the response code comprising a first portion and a second portion; verify that the first portion of the response code matches the OTP; identify a user code stored in association with the user, the user code stored in at least one data storage device prior to receiving the transaction request; verify that the second portion of the response code matches the user code; and, in response to verifying that the first portion of the response code matches the OTP and that the second portion of the response code matches the user code, automatically authorize the transaction request to be processed in an electronic payment processing network.

Clause 16: The computer program product of clause 15, wherein the user code is associated with a user profile of the user stored in the at least one data storage device, and wherein the one or more instructions further cause the at least one processor to: determine a position preference associated with the user profile, the position preference comprising an indication that: the user code should be appended in a leading position in response codes, or the user code should be appended in a trailing position in response codes; and determine the first portion and the second portion of the response code based on the position preference associated with the user profile.

Clause 17: The computer program product of clause 15 or clause 16, wherein the position preference associated with the user profile comprises an indication that the user code should be appended in a trailing position in response codes, and wherein the one or more instructions that cause the at least one processor to determine the first portion and the second portion of the response code based on the position preference associated with the user profile cause the at least one processor to: determine the first portion as being a first subsequence of characters of the response code, based on the position preference; and determine the second portion as being a second subsequence of characters of the response code, based on the position preference, wherein the second subsequence does not overlap with the first subsequence, and wherein the second subsequence is positioned after the first subsequence.

Clause 18: The computer program product of any of clauses 15-17, wherein the one or more instructions further cause the at least one processor to, before the transaction request is initiated by the user: receive the user code from the user communication device of the user; determine at least one primary account number (PAN) associated with at least one payment device of the user, wherein each PAN of the at least one PAN comprises a sequence of numbers; compare the user code to a plurality of subsequences of numbers in the at least one PAN; and, in response to determining that the user code does not match any of the plurality of subsequences of numbers in the at least one PAN, store the user code in the at least one data storage device in association with the user profile.

Clause 19: The computer program product of any of clauses 15-18, wherein the one or more instructions further cause the at least one processor to, before the transaction request is initiated by the user: receive an identification of the position preference from the user communication device of the user; and store the position preference in association with the user profile in the at least one data storage device.

Clause 20: The computer program product of any of clauses 15-19, wherein the one or more instructions further cause the at least one processor to: receive a second transaction request initiated by a second user in communication with the at least one merchant system; generate a second OTP; transmit the second OTP to a second user communication device of the second user; receive a second response code from the second user communication device of the second user, the second response code comprising a first portion and a second portion; determine that a second position preference associated with a second user profile of the second user comprises an indication that the second user code should be appended in a leading position in response codes; verify that the second portion of the second response code comprising a leading subsequence of characters in the second response code matches the second user code; verify that the first portion of the second response code comprising a trailing subsequence of characters in the second response code matches the second OTP; and in response to verifying that the first portion of the second response code matches the second OTP and that the second portion of the second response code matches the second user code, automatically authorize the second transaction request to be processed in the electronic payment processing network.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which.

DETAILED DESCRIPTION

Figure 1:
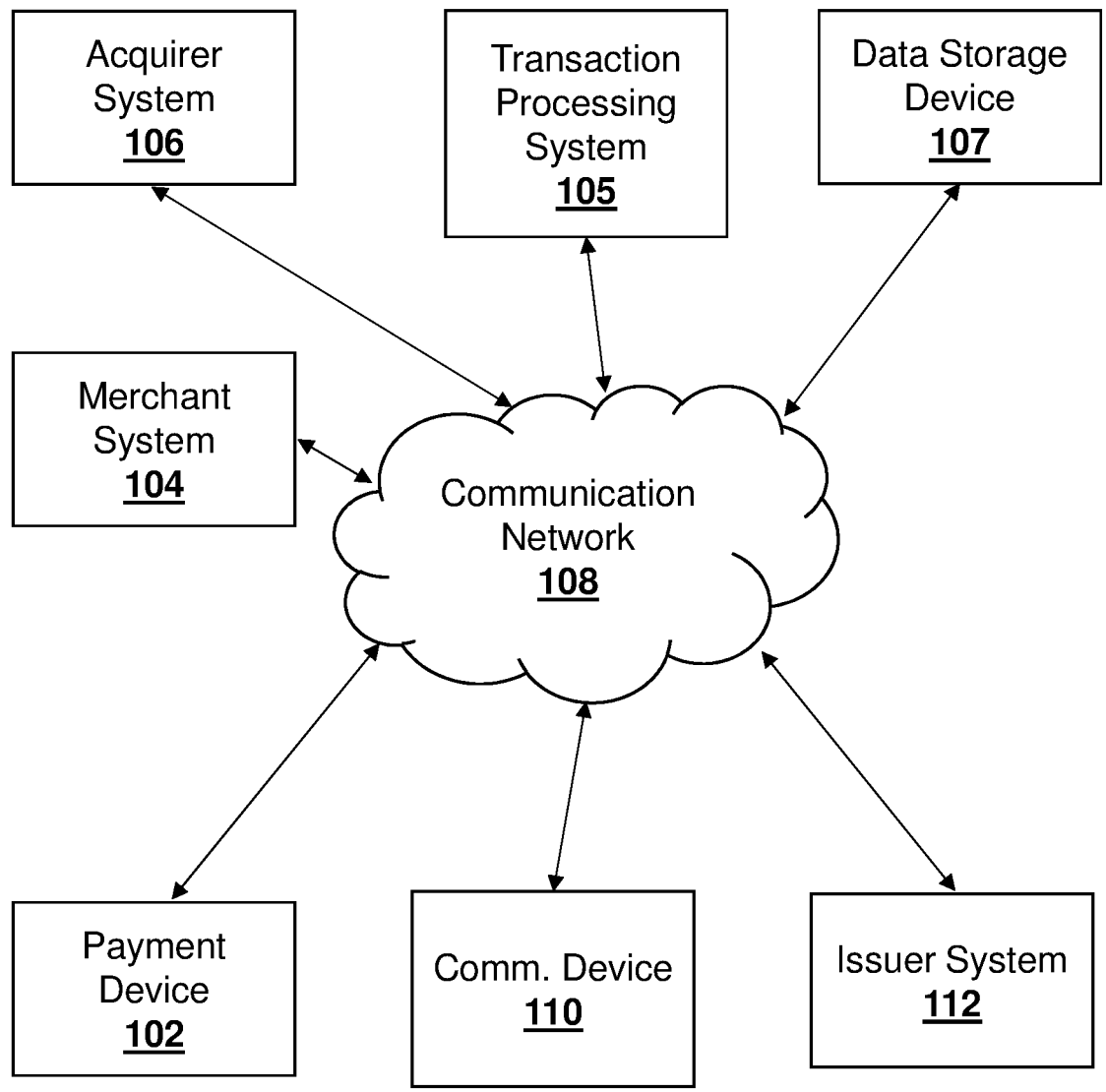
FIG. 1 is a diagram of some non-limiting embodiments or aspects of an environment in which systems, devices, products, apparatus, and/or methods, described herein, may be implemented, according to the principles of the present disclosure.

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols.

Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, one or more computing devices used by a payment device provider system, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "server" may refer to or include one or more computing devices that are operated by or facilitate communication and processing for multiple parties in a network environment, such as the internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

The methods, systems, and computer program products described herein provide numerous technical advantages in systems for transaction authentication in an electronic payment processing network. By using an enhanced response code that requires both possession of a one-time password in addition to knowledge of a secret user code, the one-time password framework closes security loopholes often created by device theft and emulation. Moreover, non-limiting embodiments of the present solution can be built upon existing frameworks for one-time passwords, without requiring deployment of new hardware and/or networks, insofar that systems where codes are generated and transmitted to users may still be utilized, but with additional checks to determine that all pieces of a response code match the expected results (e.g., one-time password and secret user code). Furthermore, non-limiting embodiments of the present solution further heighten security by allowing a user to determine a position preference for the user code in the response code, further reducing the ability of a malicious entity to brute force or guess a response code, given that the position of the user code itself is not known. Non-limiting embodiments of the present solution are also flexible to accommodate user preferences and presets of different code lengths and positioning, since the authentication checks may be based on individual user profile settings. Moreover, computing resources are reduced by combining a possession verification and a knowledge verification into a single response code input. For example, possession verifications (e.g., verifying possession of a device that receives a one-time password) were previously in one process flow and set of back-and-forth messages, and knowledge verifications (e.g., knowledge of a secret code) were previously in a process flow and set of back-and-forth messages that were separate from the possession verifications. Non-limiting embodiments of the present solution combines the possession verification and knowledge verification into a single response code input by the user, and the authentication system (e.g., issuer system, transaction processing system, etc.) may decompose the response code to verify the possession component (e.g., one-time password) and knowledge component (e.g., user code) in the same instance of communications. This combination significantly reduces computing resources (e.g., bandwidth, processing capacity, memory) required to complete a set of verifications.

Referring now to FIG. 1, FIG. 1 is a diagram of an example environment 100 in which devices, systems, and/or methods, described herein, may be implemented according to non-limiting embodiments or aspects. As shown in FIG. 1, environment 100 may include payment device 102, merchant system 104, acquirer system 106, transaction processing system 105, data storage device 107, communication device 110, issuer system 112, and communication network 108. Payment device 102, merchant system 104, acquirer system 106, transaction processing system 105, data storage device 107, communication device 110, and/or issuer system 112 may interconnect (e.g., establish a connection to communicate) via wired connections, wireless connections, or a combination of wired and wireless connections, including over one or more networks, e.g., communication network 108.

Payment device 102 may include one or more computing devices configured to communicate with merchant system 104, acquirer system 106, transaction processing system 105, data storage device 107, communication device 110, and/or issuer system 112 at least partly over communication network 108. Payment device 102 may be associated with a primary account number (PAN), which may include a sequence of characters. For example, the PAN associated with payment device 102 may include a sixteen-digit sequence of numbers. Payment device 102 may further be associated with an expiration date (e.g., for when payment device 102 is reissued), which may be represented by a sequence of numbers. For example, the payment device 102 expiration date may be represented (e.g., displayed, stored in memory, evaluated, etc.) in the format MMYY (for month and year), such as 0724 to represent July 2024. Payment device 102 may further be associated with a card verification value (CVV) code, which may include a sequence of characters used to verify possession of the payment device 102. For example, card verification value (CVV) may include a three- or four-digit sequence of numbers. Payment device 102 may be associated and/or integrated with communication device 110 (e.g., such as using a digital wallet).

Merchant system 104 may include one or more computing devices configured to communicate with payment device 102, acquirer system 106, transaction processing system 105, data storage device 107, communication device 110, and/or issuer system 112 at least partly over communication network 108. Merchant system 104 may include and/or be associated with one or more point-of-sale (POS) devices. Merchant system 104 may, such as via one or more POS devices, communicate with payment device 102 to receive payment device data to be used for completing a transaction between a user and the merchant associated with merchant system 104. Merchant system 104 may be associated with a brick-and-mortar merchant storefront for users to engage in transactions where payment device 102 is present at the point of transacting with the merchant (e.g., a card-present transaction). Merchant system 104 may also be associated with an online interface (e.g., via a website, application, etc.) for users to engage in transactions where payment device 102 is not present at the point of transaction with the merchant (e.g., a card-not-present transaction).

Acquirer system 106 may include one or more computing devices configured to communicate with payment device 102, merchant system 104, transaction processing system 105, data storage device 107, communication device 110, and/or issuer system 112 at least partly over communication network 108. Acquirer system 106 may be associated with an acquirer (e.g., banking institution) that provides a transaction account for a merchant to interact with users in an electronic payment processing network. Acquirer system 106 may be configured to communicate with merchant system 104 to initiate transaction requests (e.g., by generating and transmitting transaction authorization requests) for transactions between users and the merchant associated with merchant system 104. Acquirer system 106 may communicate with issuer system 112, directly or indirectly through transaction processing system 105, to determine if the transaction is authorized by the user associated with payment device 102, and to complete processing of the transaction to transfer payment from a transaction account of a user to a transaction account of a merchant.

Transaction processing system 105 may include one or more computing devices configured to communicate with payment device 102, merchant system 104, acquirer system 106, data storage device 107, communication device 110, and/or issuer system 112 at least partly over communication network 108. Transaction processing system 105 may be configured to receive transaction authorization requests (e.g., messages configured to request authorization for a transaction) from acquirer system 106, and may communicate those transaction authorization requests (e.g., in a modified form) to issuer system 112 for authorization of the transaction. Whether a transaction is authorized or not, the result of the issuer system 112 attempting to authorize the transaction may be communicated back from issuer system 112 to acquirer system 106 via transaction processing system 105 in a transaction authorization response (e.g., messages configured to provide an authorization response, in reply to a transaction authorization request). Transaction processing system 105 may include, and/or be integrated with, data storage device 107.

Data storage device 107 may include one or more computing devices configured to communicate with payment device 102, merchant system 104, acquirer system 106, transaction processing system 105, communication device 110, and/or issuer system 112 at least partly over communication network 108. Data storage device 107 may include one or more non-transitory data storage media configured to store one or more types of data. Data storage device 107 may be further configured to store user profiles, which may be associated with one or more payment devices, payment device data, user codes, or position preferences for user codes (e.g., leading position, trailing position, intermediate position, etc.). Data storage device 107 may be further configured to store transaction data associated with one or more transactions completed in an electronic payment processing network. Data storage device 107 may be associated with, and/or be integrated with, transaction processing system 105.

Communication device 110 may include one or more computing devices configured to communicate with payment device 102, merchant system 104, acquirer system 106, transaction processing system 105, data storage device 107, and/or issuer system 112 at least partly over communication network 108. Communication device 110 may be associated with a user. A user may use communication device 110 to receive a one-time password from issuer system 112. User may also use communication device 110 to transmit a response code to issuer system 112, the response code including a portion corresponding to the one-time password and a portion corresponding to a preset user code. Communication device 110 may include one or more user interfaces (e.g., web browsers, applications, etc.) to communicate with merchant system 104 to initiate and complete a transaction with a merchant. Communication device 110 may also include one or more user interfaces to communicate with issuer system 112, such as to set a user code, set a position preference for the user code in response codes, and view and modify other parameters of a user profile of the user. Communication device 110 may be associated and/or integrated with payment device 102.

Issuer system 112 may include one or more computing devices configured to communicate with payment device 102, merchant system 104, acquirer system 106, transaction processing system 105, data storage device 107, and/or communication device 110 at least partly over communication network 108. Issuer system 112 may be associated with an issuer (e.g., a banking institution) that issued payment device 102. Issuer system 112 may provide a transaction account associated with payment device 102 that allows user to transact with merchants in the electronic payment processing network. Issuer system 112 may further receive transaction authorization requests from acquirer systems 106 and/or merchant systems 104 (e.g., via transaction processing system 105) and determine whether the transaction is authorized. Issuer system 112 may execute at least a first verification process, which requires the user to submit (e.g., via merchant system 104) user credentials, such as a username, password, personal identification number (PIN), and/or the like. Issuer system 112 may execute at least a second verification process, which includes a step-up authentication protocol, such as an enhanced one-time password-based process, as described herein. For example, issuer system 112 may be configured to generate and transmit a one-time password (OTP) to user's communication device 110 and receive a response code from communication device 110 that includes, at least partly, the one-time password. The response code may further include a portion associated with a preset user code associated with user.

Communication network 108 may include one or more wired and/or wireless networks over which the systems and devices of environment 100 may communicate. For example, communication network 108 may include a cellular network (e.g., a long-term evolution (LTE®) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

As used herein, "electronic payment processing network" may refer to payment device 102, merchant system 104, transaction processing system 105 and/or issuer system 112, and communication network 108. "Electronic payment processing network" may further refer to acquirer system 106, data storage device 107, and/or communication device 110. It will be appreciated that an electronic payment processing network may include multiple payment devices 102, merchant systems 104, acquirer systems 106, transaction processing systems 105, data storage devices 107, communication devices 110, issuer systems 112, and/or communication networks 108.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

In some non-limiting embodiments or aspects, before transacting in the electronic payment processing network, a user may set their preferences and/or parameters associated with a user profile stored in data storage device 107. These preferences can be set for an existing payment device 102 (e.g., via a user interface of an issuer of the existing payment device 102 at some time after issuance) or for a new payment device 102 (e.g., via a user interface of an issuer of the new payment device 102 at the time of issuance). For example, the user may set a user code, a position preference associated with where in a response code the user code would appear (e.g., a leading position, a trailing position, an intermediate position, etc.), a communication address of one or more communication devices 110, a preferred mode of communication, and/or the like. The user may use communication device 110 to communicate with issuer system 112 and/or data storage device 107 to set user's profile preferences and/or parameters. For example, the user may transmit, via communication device 110, a proposed user code (e.g., a sequence of characters) to issuer system 112. Issuer system 112 may receive the user code and compare the user code to known sequences of characters associated with the user profile to prevent scenarios where the user code appears in the known sequences of characters, which would increase the ability for a malicious agent to guess the user code. For example, issuer system 112 may determine one or more PANs, expiration dates, CVV codes, and/or the like associated with one or more payment devices 102 of the user. Issuer system 112 may then compare the proposed user code to a plurality of subsequences of characters occurring in the one or more PANs, expiration dates, CVV codes, and/or the like (e.g., each subsequence of characters therein of equal length to the proposed user code). If issuer system 112 determines that the proposed user code does not match any of the plurality of subsequences, issuer system 112 may approve the proposed user code for use and may store the user code in association with the user profile in data storage device 107. If issuer system 112 determines that the proposed user code does match one or more of the plurality of subsequences, issuer system 112 may deny use of the proposed user code for use, and may prompt the user (e.g., via communication device 110) to input another proposed user code.

To illustrate, a user may input a proposed user code of "757". Issuer system 112 may look up, in data storage device 107, and determine that the user has payment device 102. Payment device 102 may have a sixteen-digit PAN, such as 4000 1234 5555 7575, an expiration date of 1225, and a CVV code of 316. Issuer system 112 may compare the proposed user code of "757" to each subsequence of three characters occurring in those items associated with payment device 102. For example, issuer system 112, when comparing the proposed user code to the sixteen-digit PAN, may decompose the PAN into fourteen subsequences of three digits, including "400", "000", "001", "012", "123", "234", "345", "455", "555", "555", "557", "575", "757", and "575". Issuer system 112 may then determine that the proposed user code "757" matches the thirteenth subsequence within the PAN, and on that basis, may reject the proposed user code of "757". In response, issuer system 112 may transmit a message to communication device 110 soliciting input of a new proposed user code. The user may then input a new proposed user code, such as "724". Issuer system 112 may then repeat the process of comparing the new proposed user code to each subsequence of characters in the information associated with payment device 102 and determine that "724" does not match any of the plurality of subsequences therein. As such, and in response, issuer system 112 may approve and store the user code in data storage device 107 in association with the user profile of the user.

In addition to the user code, the user may set a position preference for where the user code should appear within a response code input by the user. For example, the position preference may include an indication (e.g., flag, parameter, attribute, field, etc.) associated with a leading position, in which the user code would appear appended before a one-time password (e.g., user code "724" would precede OTP "412" to form response code "724412"). By way of another example, the position preference may include an indication associated with a trailing position, in which the user code would appear appended after a one-time password (e.g., user code "724" would follow OTP "412" to form response code "412724"). By way of another example, the position preference may include an indication associated with an intermediate position, in which the user code would appear embedded in a one-time password (e.g., user code "724" would appear within OTP "412" to form response code "472412" or "417242"). While sequences of three characters are often shown herein for ease of illustration, it will be appreciated that user codes and OTPs of different character length may be used in non-limiting embodiments and aspects of the disclosure. However, three-character user codes and three-character OTPs to form six-character response codes provide the benefit of low ability to be guessed while promoting user comprehension and preventing mistakes by overly long sequences of characters.

In some non-limiting embodiments or aspects, issuer system 112 may receive a transaction request initiated by a user in communication with merchant system 104. For example, user may present payment device 102 and/or input payment device 102 information (e.g., PAN, expiration date, CVV code, billing address, etc.) to a POS device of merchant system 104, for initiation of a transaction. Merchant system 104 may transmit, directly or via acquirer system 106, a transaction authorization request to issuer system 112 (e.g., such as through transaction processing system 105). To illustrate, issuer system 112 may receive a transaction request identifying a payment device 102, a transaction amount, a transaction description, and a merchant.

In some non-limiting embodiments or aspects, issuer system 112 may generate a one-time password (OTP) and transmit the OTP to communication device 110 of the user. For example, the OTP may be a uniquely generated sequence of characters (e.g., randomized numbers, letters, and/or the like) of a set length (e.g., three characters, four characters, five characters, etc.). Issuer system 112 may transmit the OTP to communication device 110 over communication network 108. For example, issuer system 112 may identify a user profile associated with the user (e.g., based on a user identifier, payment device identifier, and/or the like, included in the transaction authorization request) and determine a communication address of communication device 110 (e.g., a mobile phone number, an email address, a messaging application user tag, etc.) and transmit the OTP to the communication address (e.g., by short messaging services (SMS), text message, electronic mail, audio message, etc.). To illustrate, issuer system 112 may identify a user profile stored in data storage device 107 based on the payment device 102 identifier, determine from the user profile that the user's communication device 110 has a communication address set as a mobile phone number, and has a communication preference set as "text message". Issuer system 112 may then generate a unique OTP, such as "412", and transmit the OTP to communication device 110 of the user via text message.

In some non-limiting embodiments or aspects, the user may receive the OTP on communication device 110. User may then use a user interface of communication device 110 (e.g., a web browser accessing a website, an application, etc.) to input a response code. The response code may include a first portion that corresponds to the OTP. The response code may also include a second portion that corresponds to a preset user code. For example, prior to transacting, the user may have set a user code of "724" and a position preference of "trailing". Upon receiving the OTP of "412", the user may input a response code of "412724", where the user code is placed in a trailing position relative to the OTP. The response code may be transmitted from communication device 110 to issuer system 112 via communication network 108. Issuer system 112 may then determine the first portion and the second portion of the response code based on the user's profile stored in data storage device 107. To illustrate, issuer system 112 may determine the position preference associated with the user profile by referencing the user profile to determine that the user has set a "trailing" position. Issuer system 112 may then determine the first portion, which is intended to correspond to the OTP, as being the leading subsequence of characters in the response code and the second portion, which is intended to correspond to the user code, as being the trailing subsequence of characters in the response code. To further illustrate, when issuer system 112 receives the response code "412724", issuer system 112 may determine the second portion as being the trailing portion of "412724", which would match the user code of "724". Issuer system 112 may then determine the first portion as being the leading portion of "412724", which would match the OTP of "412".

In some non-limiting embodiments or aspects, issuer system 112 may verify that the first portion of the response code matches the OTP. Issuer system 112 may further identify a user code stored in association with the user, wherein the user code is stored in data storage device 107 prior to receiving the transaction request. Issuer system 112 may further verify that the second portion of the response code matches the user code. In response to verifying that the first portion of the response code matches the OTP and that the second portion of the response code matches the user code, issuer system 112 may automatically authorize (e.g., without requiring additional user input to proceed with) the transaction request to be processed in the electronic payment processing network (e.g., by transmitting a transaction authorization response approving the transaction, such as to merchant system 104 and/or transaction processing system 105).

In some non-limiting embodiments or aspects, issuer system 112 may be configured to flexibly accommodate user codes of different lengths and position preferences. For example, in a same deployment, issuer system 112 may receive a second transaction request initiated by a second user in communication with a same or different merchant system 104. Issuer system 112 may generate a second OTP (e.g., "592") and transmit the second OTP to a second communication device 110 of the second user associated with the second user transaction request. The second user may have a user code of same or different length (e.g., "3141") that is associated with a second user profile of the second user. Issuer system 112 may receive a second response code from second user communication device 110 of the second user, wherein the second response code also includes a first portion and a second portion. Issuer system 112 may reference the second user profile to determine that the second user has specified a position preference of "leading". In this manner, the second portion, which corresponds to the second user code, would be in a leading position relative to the first portion, which corresponds to the second OTP. To illustrate, issuer system 112 may receive the response code "3141592", in which the second portion that corresponds to the user code (e.g., "3141") is in the leading position, per the second user's position preference, and the first portion that remains corresponds to the OTP (e.g., "592"). In response to verifying that the first portion of the second response code matches the second OTP and that the second portion of the second response code matches the second user code, issuer system 112 may automatically authorize the second transaction request to be processed in the electronic payment processing network. As can be appreciated from the above illustrative examples, issuer system 112 may flexibly adapt to user codes of different lengths and position preferences within response codes, on a user-to-user basis.

Figure 2:
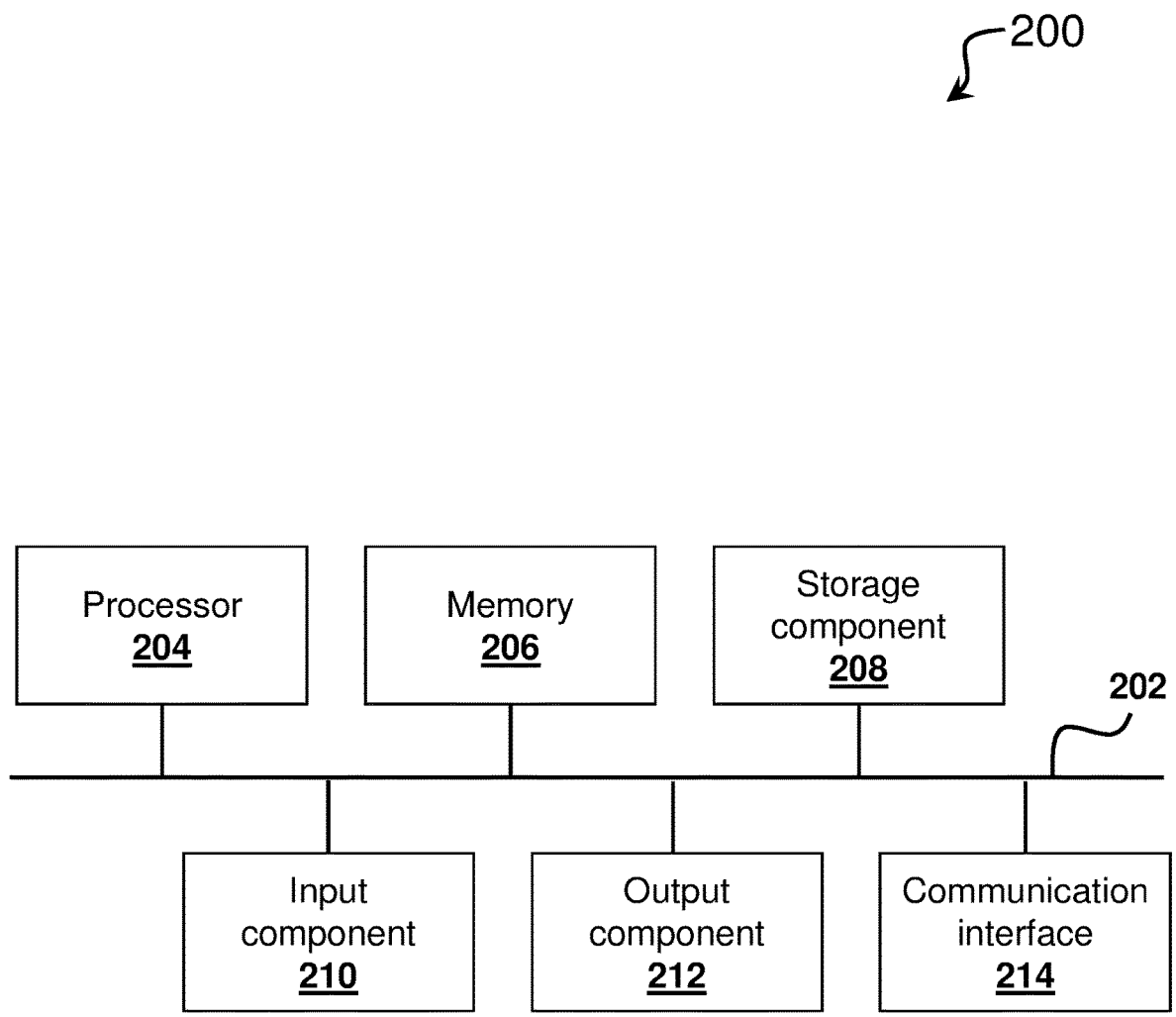
FIG. 2 is a diagram of one or more components, devices, and/or systems, according to some non-limiting embodiments or aspects.

Referring now to FIG. 2, FIG. 2 is a diagram of example components of a device 200 according to some non-limiting embodiments or aspects. Device 200 may correspond to one or more devices of payment device 102, merchant system 104, acquirer system 106, transaction processing system 105, data storage device 107, communication device 110, issuer system 112, and/or communication network 108 as shown in FIG. 1. In some non-limiting embodiments or aspects, such systems or devices may include at least one device 200 and/or at least one component of device 200.

As shown in FIG. 2, device 200 may include bus 202, processor 204, memory 206, storage component 208, input component 210, output component 212, and communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
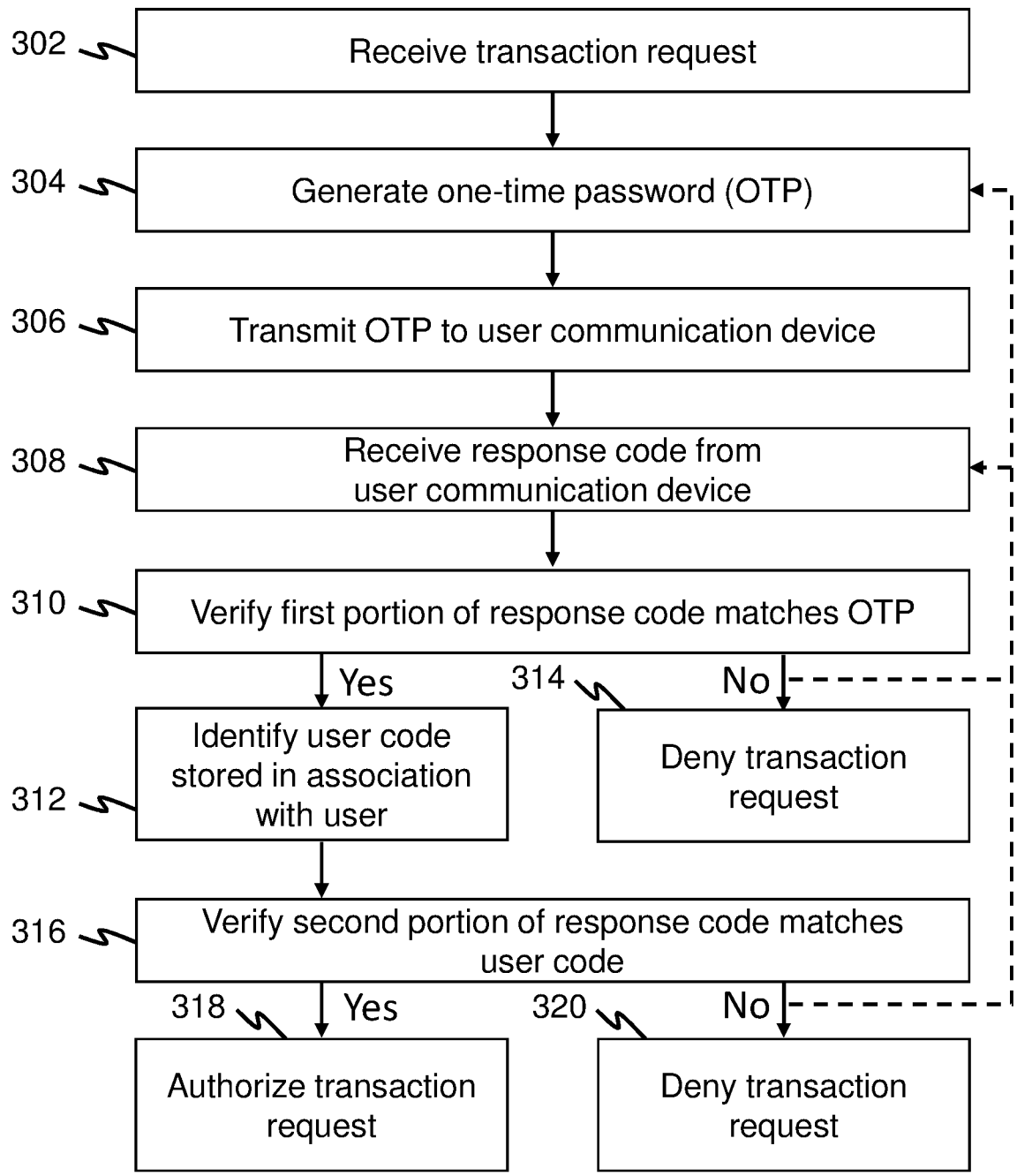
FIG. 3 is a flowchart of a method for enhanced one-time password-based transaction authorization, according to some non-limiting embodiments or aspects.

Referring now to FIG. 3, FIG. 3 is a flowchart of some non-limiting embodiments or aspects of a process 300 for enhanced one-time password-based transaction authorization. The steps shown in FIG. 3 are for example purposes only. It will be appreciated that additional, fewer, different, and/or a different order of steps may be used in non-limiting embodiments or aspects. In some non-limiting embodiments or aspects, one or more of the steps of process 300 may be performed (e.g., completely, partially, and/or the like) by transaction processing system 105 and/or issuer system 112. In some non-limiting embodiments or aspects, one or more of the steps of process 300 may be performed (e.g., completely, partially, and/or the like) by another system, another device, another group of systems, or another group of devices, separate from or including transaction processing system 105 and/or issuer system 112. In some non-limiting embodiments or aspects, one or more steps may be performed automatically in response to a prior step being performed or completed.

As shown in FIG. 3, at step 302, process 300 may include receiving a transaction request. For example, issuer system 112 may receive a transaction request initiated by a user in communication with at least one merchant system 104. User may present and/or input payment device 102 data to at least one POS device of merchant system 104 to initiate the transaction.

As shown in FIG. 3, at step 304, process 300 may include generating a one-time password (OTP). For example, in response to receiving the transaction request, issuer system 112 may generate a unique OTP, which may include a sequence of characters having a character length (e.g., a three-digit code).

As shown in FIG. 3, at step 306, process 300 may include transmitting the OTP to user communication device 110. For example, after generating the OTP, issuer system 112 may transmit the OTP to communication device 110 of user, such as via communication network 108. The OTP may be transmitted to communication device 110 in a first communication channel (e.g., SMS, text message, audio message, email, etc.).

As shown in FIG. 3, at step 308, process 300 may include receiving a response code from user communication device 110. For example, after transmitting the OTP to communication device 110 of user, issuer system 112 may receive back from communication device 110, through a same or separate communication channel as the transmitted OTP, a response code. The response code may include a first portion and a second portion, which may be determined by issuer system 112 based on a user profile of the user. In some non-limiting embodiments or aspects, the response code may include a sequence of characters, the first portion of which may include a first subsequence of characters, and the second portion of which may include a second subsequence of characters. In some non-limiting embodiments or aspects, the sequence of characters of the response code may include a sequence of six numbers, wherein the first subsequence of characters includes a subsequence of three numbers, and wherein the second subsequence of characters also includes a subsequence of three numbers.

As shown in FIG. 3, at step 310, process 300 may include verifying that the first portion of the response code matches the OTP. For example, issuer system 112 may compare the first portion of the response code to the OTP that was generated and transmitted to communication device 110 in steps 304 and 306. In response to determining that the first portion of the response code matches the OTP, issuer system 112 may verify that the first portion of the response code matches the OTP, allowing process 300 to proceed to step 312 and/or 318. In response to determining that the first portion of the response code does not match the OTP, issuer system 112 may fail to verify that the first portion of the response code matches the OTP, preventing process 300 from proceeding to step 312 and/or step 318. If issuer system 112 determines that the first portion of the response code does not match the OTP, issuer system 112 may instead regenerate the OTP in step 304 and retransmit the regenerated OTP in step 306, to allow the user to try again. Additionally or alternatively, issuer system 112 may prompt communication device 110 to try again with the original OTP and to retransmit the response code to issuer system 112 for a second verification, in step 308. Additionally or alternatively, after one or more failures to verify that the first portion of the response code matches the OTP, issuer system 112 may, in step 314, deny the transaction request (e.g., transmit a transaction authorization response indicating that the transaction is not authorized).

As shown in FIG. 3, at step 312, process 300 may include identifying a user code stored in association with the user. For example, issuer system 112 may identify a user code (e.g., a sequence of characters, such as a string of letters, a string of numbers, etc.) stored in association with the user, wherein the user code is stored in at least one data storage device 107 prior to issuer system 112 receiving the transaction request.

As shown in FIG. 3, at step 316, process 300 may include verifying that the second portion of the response code matches the user code. For example, issuer system 112 may compare the user code that was identified in step 312 to a second portion of the response code to determine if the second portion of the response code matches the user code. If issuer system 112 determines that the second portion matches the user code, issuer system 112 may successfully verify that the second portion of the response code matches the user code and may proceed to step 318. If issuer system 112 determines that the second portion does not match the user code, issuer system 112 may fail to verify that the second portion matches the user code. In response to failing to verify that the second portion matches the user code, issuer system 112 may regenerate the OTP (in step 304) and retransmit the regenerated OTP (in step 306) to allow the user to try again. Additionally or alternatively, issuer system 112 may prompt the user to try again and may receive an updated response code from the user in step 308, allowing issuer system 112 to reattempt the verifications in step 310 and step 316. Additionally or alternatively, after one or more failures to verify that the second portion of the response code matches the user code, issuer system 112 may, in step 320, deny the transaction request.

In some non-limiting embodiments or aspects, prior to making the verifications in step 310 or step 316, issuer system 112 may determine a position preference associated with the user profile of the user. The position preference may include an indication that the user code should be appended in a leading position in response codes, in a trailing position in response codes, in an intermediate position in response codes, and/or the like. Based on the position preference, issuer system 112 may determine the first portion and the second portion of the response code. In some non-limiting embodiments, when determining the first portion and the second portion, issuer system 112 may determine that the position preference associated with the user profile includes an indication that the user code should be appended in a trailing position in response codes, and thereby determine that the first portion is a first subsequence of characters of the response code and the second portion is a second subsequence of characters of the response code. Issuer system 112 may further, when determining the first portion and the second portion of the response code, determine that the second subsequence does not overlap with the first subsequence and that the second subsequence is positioned after the first subsequence, based on a position preference including an indication that the user code should be appended in a trailing position.

In some non-limiting embodiments or aspects, process 300 may include multiple repetitions of steps 302-320 for a plurality of transaction requests in the electronic payment processing network by a plurality of users. It will be appreciated that each user may predetermine their own user code and position preference associated with their own user profile (see, e.g., FIG. 4). Because user codes and position preferences may be associated with user profiles associated with users, issuer system 112 is capable of acting flexibly on different user codes, user codes of different lengths, user codes at different positions in response codes, and/or the like.

As shown in FIG. 3, process 300 may include, in a subsequent iteration of step 302, receiving a second transaction request. For example, issuer system 112 may receive a second transaction request initiated by a second user in communication with the at least one merchant system 104.

As shown in FIG. 3, process 300 may include, in a subsequent iteration of step 304, generating a second OTP. For example, issuer system 112 may generate a second OTP, different from the first OTP. Each generation of an OTP may be randomized, for security purposes.

As shown in FIG. 3, process 300 may include, in a subsequent iteration of step 306, transmitting the second OTP to a second user communication device 110. For example, issuer system 112 may transmit the second OTP to a second user communication device 110 associated with the second user.

As shown in FIG. 3, process 300 may include, in a subsequent iteration of step 308, receiving a second response code from the second user communication device 110. For example, issuer system 112 may receive the second response code from the second user communication device 110 of the second user, wherein the second response code includes a first portion and a second portion. A position preference associated with the second user profile of the second user may include an indication that the second user code should be appended in a leading position. Therefore, issuer system 112 may determine that the first portion, which corresponds to the OTP, is a first subsequence of characters of the second response code being in a trailing position behind a second subsequence of characters of the second response code, the second subsequence of characters corresponding to the second user code.

As shown in FIG. 3, process 300 may include, in a subsequent iteration of step 310, verifying that the first portion of the second response code matches the second OTP. For example, issuer system 112 may compare the first portion of the second response code (e.g., in the trailing position) to the second OTP to verify if there is a match. If there is a match, issuer system 112 may proceed to step 312. If there is not a match, issuer system 112 may proceed back to step 304, step 308, or proceed to step 314 and deny the second transaction request.

As shown in FIG. 3, process 300 may include, in a subsequent iteration of step 312, identify the second user code stored in association with the second user. For example, issuer system 112 may identify the second user code stored in association with the second user, wherein the second user code is stored in at least one data storage device 107 prior to issuer system 112 receiving the second transaction request.

As shown in FIG. 3, process 300 may include, in a subsequent iteration of step 316, verifying that the second portion of the second response code matches the second user code. For example, issuer system 112 may compare the second portion of the second response code (e.g., in the leading position) to the second user code to verify if there is a match. If there is a match, issuer system 112 may proceed to step 318 and authorize the second transaction request. If there is no match, issuer system 112 may proceed back to step 304, step 308, or proceed to step 320 and deny the second transaction request.

Figure 4:
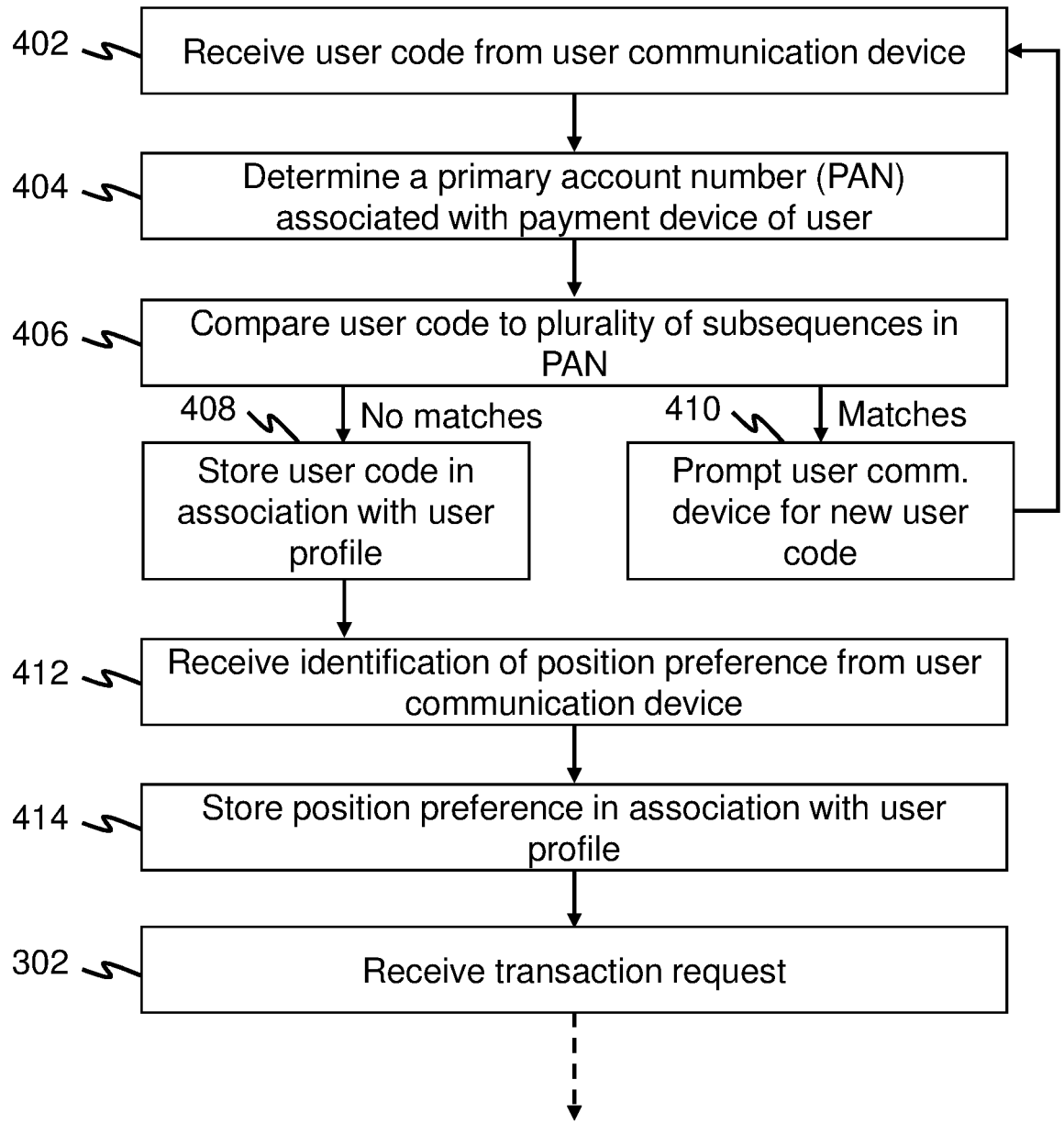
FIG. 4 is a flowchart of a method for enhanced one-time password-based transaction authorization, according to some non-limiting embodiments or aspects.

Referring now to FIG. 4, FIG. 4 is a flowchart of some non-limiting embodiments or aspects of a process 400 for enhanced one-time password-based transaction authorization. The steps shown in FIG. 4 are for example purposes only. It will be appreciated that additional, fewer, different, and/or a different order of steps may be used in non-limiting embodiments or aspects. In some non-limiting embodiments or aspects, one or more of the steps of process 400 may be performed (e.g., completely, partially, and/or the like) by transaction processing system 105 and/or issuer system 112. In some non-limiting embodiments or aspects, one or more of the steps of process 400 may be performed (e.g., completely, partially, and/or the like) by another system, another device, another group of systems, or another group of devices, separate from or including transaction processing system 105 and/or issuer system 112. In some non-limiting embodiments or aspects, one or more steps may be performed automatically in response to a prior step being performed or completed. Process 400 (shown in FIG. 4) may precede process 300 (shown in FIG. 3), for each user, prior to each user transacting in the electronic payment processing network.

As shown in FIG. 4, at step 402, process 400 may include receiving a user code from a user communication device 110. For example, issuer system 112 may receive the user code from the user communication device 110 of the user. The user code may be a sequence of characters, and issuer system 112 may require the user to select a user code that matches a predefined set of parameters, including length, types of characters, use of special characters, and/or the like.

As shown in FIG. 4, at step 404, process 400 may include determining a primary account number (PAN) associated with payment device 102 of the user. For example, issuer system 112 may determine at least one PAN associated with at least one payment device 102 of the user. Each PAN may include a sequence of numbers.

As shown in FIG. 4, at step 406, process 400 may include comparing the user code to a plurality of subsequences in the PAN. For example, issuer system 112 may compare the user code to a plurality of subsequences of numbers in the at least one PAN.

As shown in FIG. 4, at step 408, process 400 may include storing the user code in association with the user profile. For example, in response to determining that the user code does not match any of the plurality of subsequences of numbers in the at least one PAN, issuer system 112 may store the user code in the at least one data storage device 107 in association with the user profile.

As shown in FIG. 4, at step 410, process 400 may include prompting the user communication device 110 for a new user code. For example, in response to determining that the user code matches one or more of the plurality of subsequences of numbers in the at least one PAN, issuer system 112 may prompt the user communication device 110 for a new user code. Issuer system 112 may then proceed back to step 402 and receive the new user code, as prompted.

As shown in FIG. 4, at step 412, process 400 may include receiving an identification of a position preference from user communication device 110. For example, issuer system 112 may receive an identification of the position preference from the user communication device of the user.

As shown in FIG. 4, at step 414, process 400 may include storing the position preference in association with the user profile. For example, issuer system 112 may store the position preference received in step 412 in association with the user profile, in the at least one data storage device 107.

In some non-limiting embodiments or aspects, steps 402-414 may precede a respective user transacting in the electronic payment processing network. Therefore, after the user has completed setting a user code and identifying a position preference, the process 400 may proceed to step 304, including receiving a transaction request as initiated by the respective user (see, e.g., FIG. 3).

Figure 5:
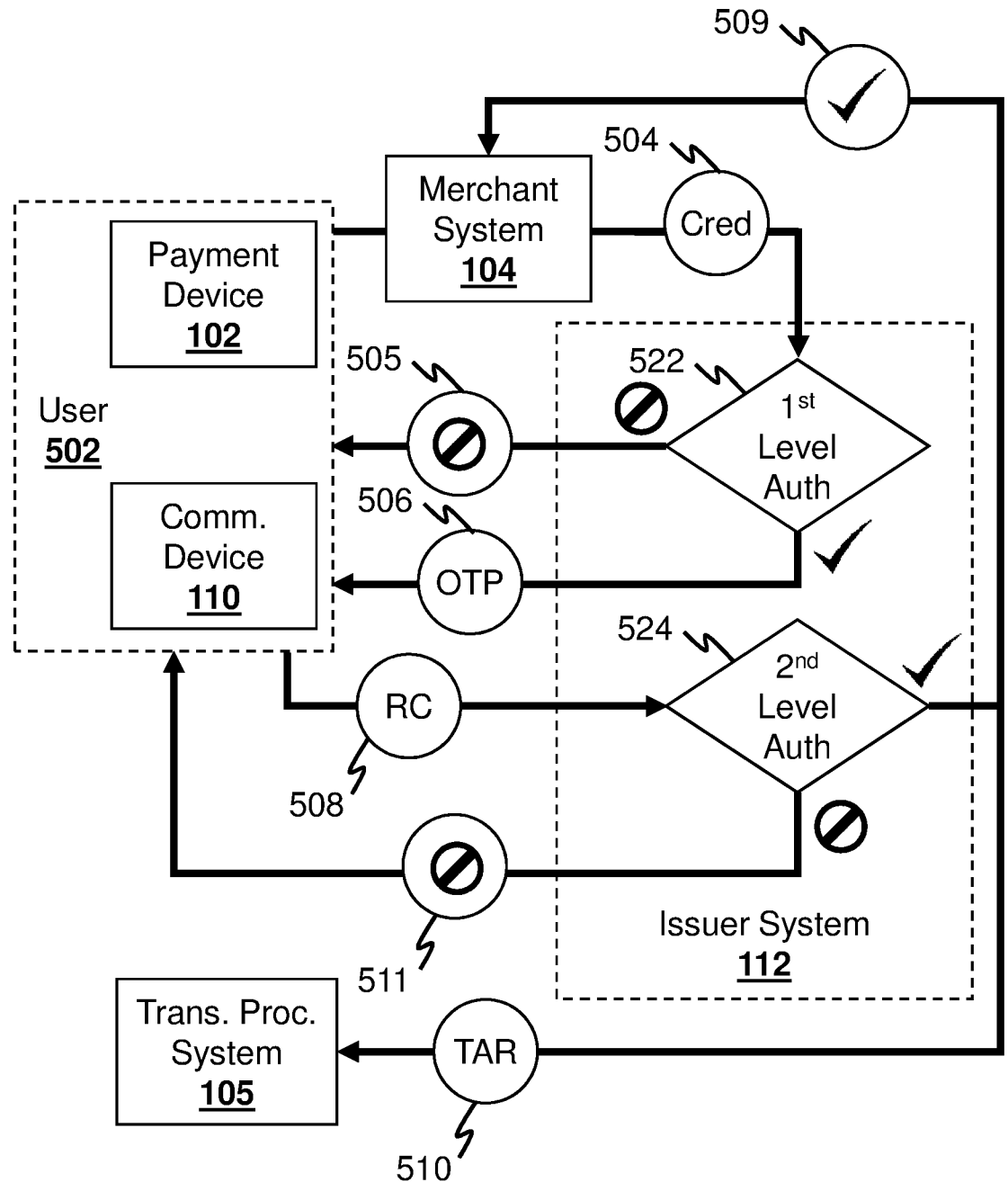
FIG. 5 is a flow diagram of a system and method for enhanced one-time password-based transaction authorization, according to some non-limiting embodiments or aspects.

Referring now to FIG. 5, FIG. 5 is a flow diagram of some non-limiting embodiments or aspects of a process 500 for enhanced one-time password-based transaction authorization. Rectangular elements represent systems and devices in the process 500. Circular elements represent transmitted data in the process 500. Diamond-shaped elements represent decision-based processes used for authentication. Arrows indicate a general order of process flow. Dashed lines indicate one or more elements associated in a group with a same system, device, or entity. Checkmarks represent successful authentication, and struck-through circles represent failed authentication. It will be appreciated that additional, fewer, different, and/or a different order of steps may be used in non-limiting embodiments or aspects.

As shown in FIG. 5, process 500 may include user 502 using payment device 102 to initiate a transaction with merchant system 104. For example, user 502 may engage in an online transaction with a POS device of merchant system 104 and may input user's 502 payment device 102 data. Merchant system 104 may receive the payment device 102 data and generate a transaction authorization request and transmit the transaction authorization request to issuer system 112, directly or indirectly via transaction processing system 105. User 502 may also input credentials 504 (e.g., username, password, PIN, etc.) that are forward to issuer system 112. Credentials 504 may be input by user 502 via communication device 110 in a same or separate communication channel as the flow for transmitting the payment device 102 data. Credentials 504 may be sent directly to issuer system 112 from communication device 110, or may be forwarded to issuer system 112 via merchant system 104 (e.g., in transaction authorization request).

As shown in FIG. 5, process 500 may include issuer system 112 receiving the transaction authorization request and credentials 504 from user 502 and/or merchant system 104. Issuer system 112 may then execute a first-level authentication process 522 wherein issuer system 112 evaluates credentials 504. If issuer system 112 cannot authenticate credentials 504 (e.g., the username, password, PIN, etc., are not correct as predefined for user 502), then issuer system 112 may transmit a failed first-level authentication response message 505 to user 502 (e.g., communication device 110). If issuer system 112 successfully authenticates credentials 504 (e.g., the username, password, PIN, etc., are corrected as predefined for user 502), then issuer system 112 may transmit a successful first-level authentication response message and/or proceed with a second round of authentication.

As shown in FIG. 5, process 500 may include a second round of authentication in which issuer system 112 generates and transmits a OTP 506 to user 502 (e.g., communication device 110). User 502 may then input a response code (RC) 508 and transmit response code 508 back to issuer system 112. Response code 508 may include a first portion corresponding to OTP 506 and a second portion corresponding to a preset user code associated with user 502. Issuer system 112 may then attempt to authenticate response code 508 in a second-level authentication process 524. If issuer system 112 verifies that the first portion of response code 508 matches OTP 506, and verifies that the second portion of response code 508 matches the preset user code, issuer system 112 may transmit a successful second-level authentication response message 509 to merchant system 104. Additionally or alternatively, issuer system 112 may generate and transmit a transaction authentication response (TAR) 510 to transaction processing system 105 indicating that the transaction is approved for processing. If issuer system 112 determines that either the first portion of response code 508 does not match OTP 506 or that the second portion of response code 508 does not match the preset user code, then issuer system 112 may generate a failed second-level authentication response message 511 to user 502, which may prompt user 502 to try to re-enter response code 508.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect, and one or more steps may be taken in a different order than presented in the present disclosure.

What is claimed is:

1. A computer-implemented method comprising:
    receiving, with at least one processor, a transaction request initiated by a user in communication with at least one merchant system;
    generating, with at least one processor, a one-time password (OTP);
    transmitting, with at least one processor, the OTP to a user communication device of the user;
    receiving, with at least one processor, a response code from the user communication device of the user, the response code comprising a first portion and a second portion;
    determining, with at least one processor, a position preference associated with a user profile of the user, the position preference comprising an indication that a user code should be appended in a leading position in response codes or the user code should be appended in a trailing position in the response codes; and
    determining, with at least one processor, the first portion as being a first subsequence of the response code based on the position preference;
    determining the second portion as being a second subsequence of the response code based on the position preference;
    verifying, with at least one processor, that the first portion of the response code matches the OTP;
    identifying, with at least one processor, the user code stored in association with the user profile, the user code stored in at least one data storage device prior to receiving the transaction request;
    verifying, with at least one processor, that the second portion of the response code matches the user code; and
    in response to verifying that the first portion of the response code matches the OTP and that the second portion of the response code matches the user code, automatically authorizing, with at least one processor, the transaction request to be processed in an electronic payment processing network.

2. The computer-implemented method of claim 1, wherein the position preference associated with the user profile comprises an indication that the user code should be appended in a trailing position in response codes, and wherein determining the first portion and the second portion of the response code based on the position preference associated with the user profile comprises:
    determining the first portion as being a first subsequence of characters of the response code, based on the position preference; and
    determining the second portion as being a second subsequence of characters of the response code, based on the position preference, wherein the second subsequence of the response code does not overlap with the first subsequence of the response code, and wherein the second subsequence of the response code is positioned after the first subsequence of the response code.

3. The computer-implemented method of claim 2, further comprising, before the transaction request is initiated by the user:
    receiving, with at least one processor, the user code from the user communication device of the user;
    determining, with at least one processor, at least one primary account number (PAN) associated with at least one payment device of the user, wherein each PAN of the at least one PAN comprises a sequence of numbers;
    comparing, with at least one processor, the user code to a plurality of subsequences of numbers in the at least one PAN; and
    in response to determining that the user code does not match any of the plurality of subsequences of numbers in the at least one PAN, storing, with at least one processor, the user code in the at least one data storage device in association with the user profile.

4. The computer-implemented method of claim 3, further comprising, before the transaction request is initiated by the user:
    receiving, with at least one processor, an identification of the position preference from the user communication device of the user; and
    storing, with at least one processor, the position preference in association with the user profile in the at least one data storage device.

5. The computer-implemented method of claim 2, further comprising:
    receiving, with at least one processor, a second transaction request initiated by a second user in communication with the at least one merchant system;
    generating, with at least one processor, a second OTP;
    transmitting, with at least one processor, the second OTP to a second user communication device of the second user;
    receiving, with at least one processor, a second response code from the second user communication device of the second user, the second response code comprising a first portion and a second portion;

determining, with at least one processor, that a second position preference associated with a second user profile of the second user comprises an indication that the a second user code should be appended in a leading position in response codes;

verifying, with at least one processor, that the second portion of the second response code comprising a leading subsequence of characters in the second response code matches the second user code;

verifying, with at least one processor, that the first portion of the second response code comprising a trailing subsequence of characters in the second response code matches the second OTP; and in response to verifying that the first portion of the second response code matches the second OTP and that the second portion of the second response code matches the second user code, automatically authorizing, with at least one processor, the second transaction request to be processed in the electronic payment processing network.

6. The computer-implemented method of claim 1, wherein the response code comprises a sequence of characters, the first portion comprises a first subsequence of characters in the sequence of characters, and the second portion comprises a second subsequence of characters in the sequence of characters.

7. The computer-implemented method of claim 6, wherein the sequence of characters of the response code comprises a sequence of six numbers, the first subsequence of characters comprises a subsequence of three numbers, and the second subsequence of characters comprises a subsequence of three numbers.

8. A system comprising at least one processor programmed or configured to:
receive a transaction request initiated by a user in communication with at least one merchant system;
generate a one-time password (OTP);
transmit the OTP to a user communication device of the user;
receive a response code from the user communication device of the user, the response code comprising a first portion and a second portion;
determine a position preference associated with a user profile of the user, the position preference comprising an indication that a user code should be appended in a leading position in response codes or the user code should be appended in a trailing position in the response codes; and
determine the first portion as being a first subsequence of the response code based on the position preference;
determine the second portion as being a second subsequence of the response code based on the position preference;
verify that the first portion of the response code matches the OTP;
identify the user code stored in association with the user profile, the user code stored in at least one data storage device prior to receiving the transaction request;
verify that the second portion of the response code matches the user code; and
in response to verifying that the first portion of the response code matches the OTP and that the second portion of the response code matches the user code, automatically authorize the transaction request to be processed in an electronic payment processing network.

9. The system of claim 8, wherein the position preference associated with the user profile comprises an indication that the user code should be appended in a trailing position in response codes, and wherein, when determining the first portion and the second portion of the response code based on the position preference associated with the user profile, the at least one processor is programmed or configured to:
determine the first portion as being a first subsequence of characters of the response code, based on the position preference; and
determine the second portion as being a second subsequence of characters of the response code, based on the position preference, wherein the second subsequence of the response code does not overlap with the first subsequence of the response code, and wherein the second subsequence of the response code is positioned after the first subsequence of the response code.

10. The system of claim 9, wherein the at least one processor is further programmed or configured to, before the transaction request is initiated by the user:
receive the user code from the user communication device of the user;
determine at least one primary account number (PAN) associated with at least one payment device of the user, wherein each PAN of the at least one PAN comprises a sequence of numbers;
compare the user code to a plurality of subsequences of numbers in the at least one PAN; and
in response to determining that the user code does not match any of the plurality of subsequences of numbers in the at least one PAN, store the user code in the at least one data storage device in association with the user profile.

11. The system of claim 10, wherein the at least one processor is further programmed or configured to, before the transaction request is initiated by the user:
receive an identification of the position preference from the user communication device of the user; and
store the position preference in association with the user profile in the at least one data storage device.

12. The system of claim 9, wherein the at least one processor is further programmed or configured to:
receive a second transaction request initiated by a second user in communication with the at least one merchant system;
generate a second OTP;
transmit the second OTP to a second user communication device of the second user;
receive a second response code from the second user communication device of the second user, the second response code comprising a first portion and a second portion;
determine that a second position preference associated with a second user profile of the second user comprises an indication that the a second user code should be appended in a leading position in the response codes;
verify that the second portion of the second response code comprising a leading subsequence of characters in the second response code matches the second user code;
verify that the first portion of the second response code comprising a trailing subsequence of characters in the second response code matches the second OTP; and
in response to verifying that the first portion of the second response code matches the second OTP and that the second portion of the second response code matches the second user code, automatically authorize the second transaction request to be processed in the electronic payment processing network.

13. A computer program product comprising at least one non-transitory computer-readable medium comprising one or more instructions that, when executed by at least one processor, cause the at least one processor to:
receive a transaction request initiated by a user in communication with at least one merchant system;
generate a one-time password (OTP);
transmit the OTP to a user communication device of the user;
receive a response code from the user communication device of the user, the response code comprising a first portion and a second portion;
determine a position preference associated with a user profile of the user, the position preference comprising an indication that a user code should be appended in a leading position in response codes or the user code should be appended in a trailing position in the response codes; and
determine the first portion as being a first subsequence of the response code based on the position preference;
determine the second portion as being a second subsequence of the response code based on the position preference;
verify that the first portion of the response code matches the OTP;
identify the user code stored in association with the user profile, the user code stored in at least one data storage device prior to receiving the transaction request;
verify that the second portion of the response code matches the user code; and
in response to verifying that the first portion of the response code matches the OTP and that the second portion of the response code matches the user code, automatically authorize the transaction request to be processed in an electronic payment processing network.

14. The computer program product of claim 13, wherein the position preference associated with the user profile comprises an indication that the user code should be appended in a trailing position in response codes, and wherein the one or more instructions that cause the at least one processor to determine the first portion and the second portion of the response code based on the position preference associated with the user profile cause the at least one processor to:
determine the first portion as being a first subsequence of characters of the response code, based on the position preference; and
determine the second portion as being a second subsequence of characters of the response code, based on the position preference, wherein the second subsequence of the response code does not overlap with the first subsequence of the response code, and wherein the second subsequence of the response code is positioned after the first subsequence of the response code.

15. The computer program product of claim 14, wherein the one or more instructions further cause the at least one processor to, before the transaction request is initiated by the user:
receive the user code from the user communication device of the user;
determine at least one primary account number (PAN) associated with at least one payment device of the user, wherein each PAN of the at least one PAN comprises a sequence of numbers;
compare the user code to a plurality of subsequences of numbers in the at least one PAN; and
in response to determining that the user code does not match any of the plurality of subsequences of numbers in the at least one PAN, store the user code in the at least one data storage device in association with the user profile.

16. The computer program product of claim 15, wherein the one or more instructions further cause the at least one processor to, before the transaction request is initiated by the user:
receive an identification of the position preference from the user communication device of the user; and
store the position preference in association with the user profile in the at least one data storage device.

17. The computer program product of claim 14, wherein the one or more instructions further cause the at least one processor to:
receive a second transaction request initiated by a second user in communication with the at least one merchant system;
generate a second OTP;
transmit the second OTP to a second user communication device of the second user;
receive a second response code from the second user communication device of the second user, the second response code comprising a first portion and a second portion;
determine that a second position preference associated with a second user profile of the second user comprises an indication that the a second user code should be appended in a leading position in response codes;
verify that the second portion of the second response code comprising a leading subsequence of characters in the second response code matches the second user code;
verify that the first portion of the second response code comprising a trailing subsequence of characters in the second response code matches the second OTP; and
in response to verifying that the first portion of the second response code matches the second OTP and that the second portion of the second response code matches the second user code, automatically authorize the second transaction request to be processed in the electronic payment processing network.

* * * * *